Figure 1:
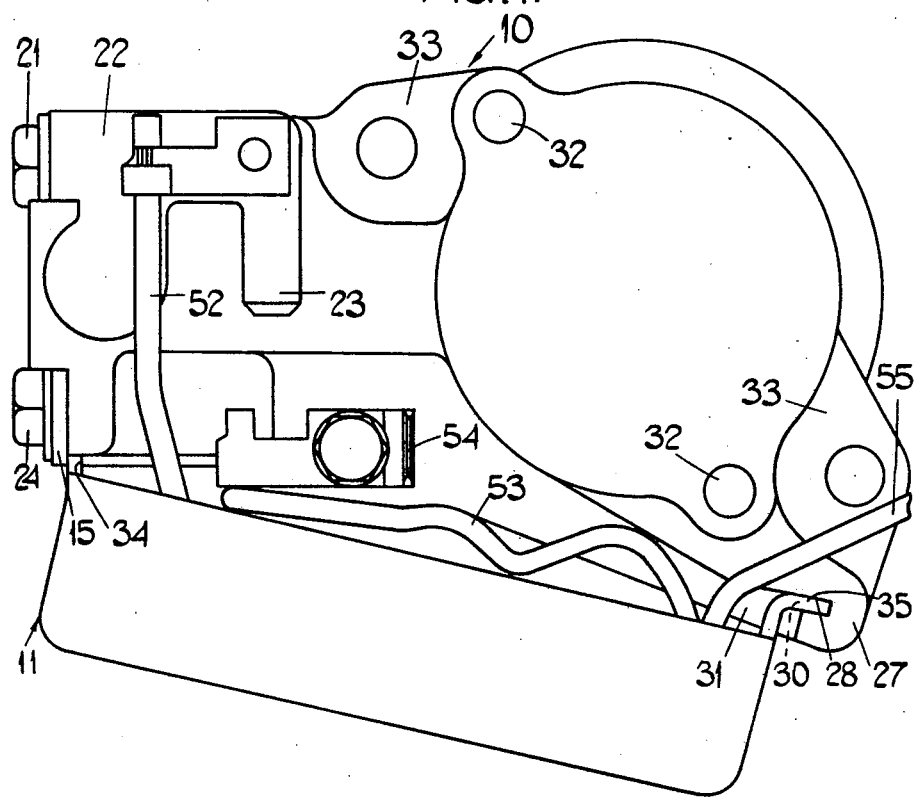

United States Patent [19]

Allport et al.

[11] 4,197,473
[45] Apr. 8, 1980

[54] VOLTAGE REGULATOR AND BRUSH ASSEMBLY

[75] Inventors: Maurice J. Allport, Birmingham; Robert Hemmings, Halesowen, both of England

[73] Assignee: Lucas Industries Limited, Birmingham, England

[21] Appl. No.: 843,243

[22] Filed: Oct. 18, 1977

[30] Foreign Application Priority Data

Oct. 22, 1976 [GB] United Kingdom ............... 44042/76

[51] Int. Cl.² .......................................... H02K 11/00
[52] U.S. Cl. .................................. 310/68 D; 310/239
[58] Field of Search .................. 310/68 R, 68 D, 239, 310/246

[56] References Cited

U.S. PATENT DOCUMENTS 3,586,892  9/1978  Sato ..................................... 310/239

FOREIGN PATENT DOCUMENTS 1095451 12/1967 United Kingdom .

Primary Examiner—Donovan F. Duggan
Attorney, Agent, or Firm—Trexler, Wolters, Bushnell & Fosse, Ltd.

[57] ABSTRACT

A voltage regulator and brush assembly for an alternator has a body of the voltage regulator mounted on a housing of the brush assembly. A screw passes through an apertured flange at one end of the body of the voltage regulator and engages in a screw threaded hole in a recessed surface on the housing of the brush assembly. At the other end of the body of the voltage regulator there are provided two tongues which define a slot having an inwardly tapering free end. A recess facing the fixing screw is provided in the brush housing and the tongues engage in the recess so that the slot between the tongues abuts against a correspondingly shaped shoulder in the recess whereby when the screw is tightened the tongues engage in the recess with a wedging action which provides a firm, vibration-free connection between the voltage regulator and the brush housing.

5 Claims, 6 Drawing Figures

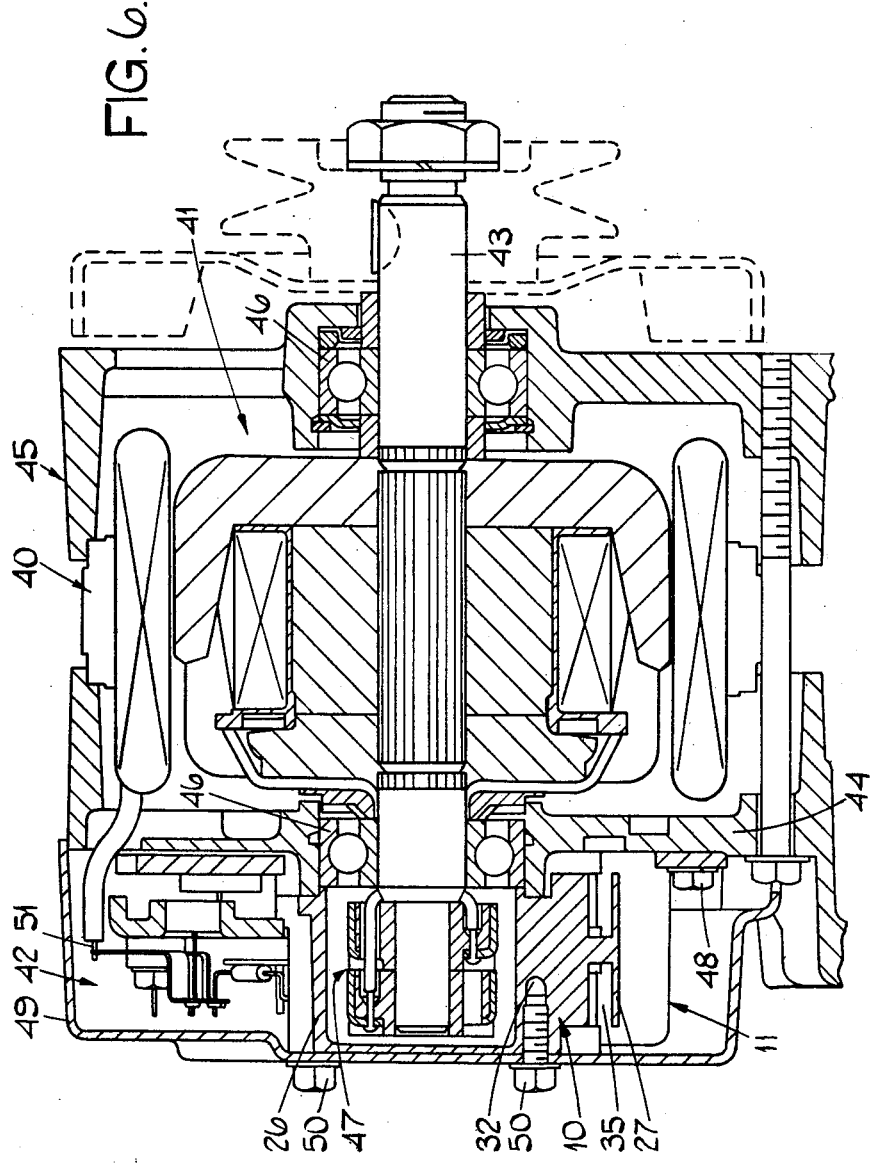

VOLTAGE REGULATOR AND BRUSH ASSEMBLY

This invention relates to a voltage regulator and brush assembly and is more particularly concerned with a voltage regulator and brush assembly and also relates to an alternator including such an assembly.

According to one aspect of the present invention, there is provided a voltage regulator and brush assembly in which a body of the voltage regulator is mounted on a housing of the brush assembly by means of a screw connection and a co-operating wedging formation between a tongue projecting from the body and a recess in the housing, in which recess the tongue engages, the screw connection and co-operating wedging formation being arranged so that tightening of the screw connection serves to increase the wedging action between the tongue and the recess whereby a firm connection between the voltage regulator and the brush housing is obtained.

Preferably, the tongue has a slot in a free end thereof, said slot tapering inwardly from the free end, and the recess in the housing has a shoulder therein which increases in width inwardly from an opening of the recess into which the tongue projects.

Preferably also, the housing has a reinforcing rib which extends from the shoulder under the regulator body towards the screw connection, and an extension of the slot in the tongue of the regulator body accommodates the rib.

According to another aspect of the present invention, there is provided an alternator including a voltage regulator and a brush assembly as defined in any one of the last preceding three paragraphs.

Figure 2:
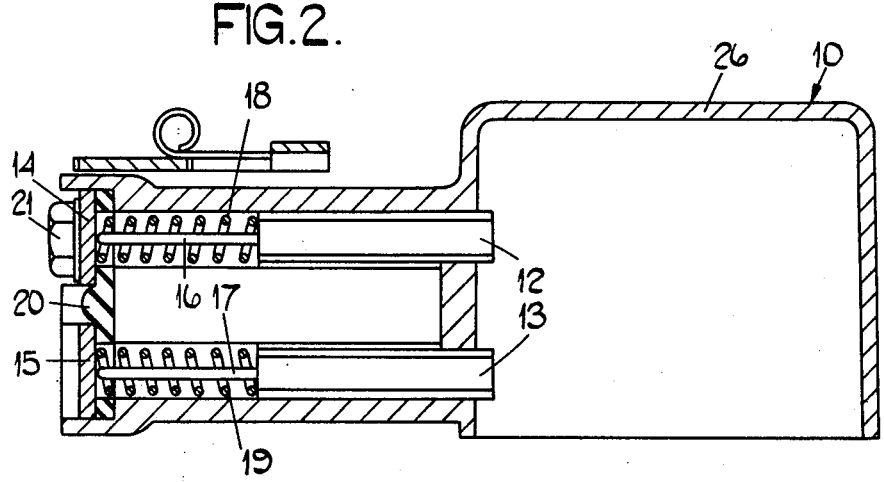
Figure 3:
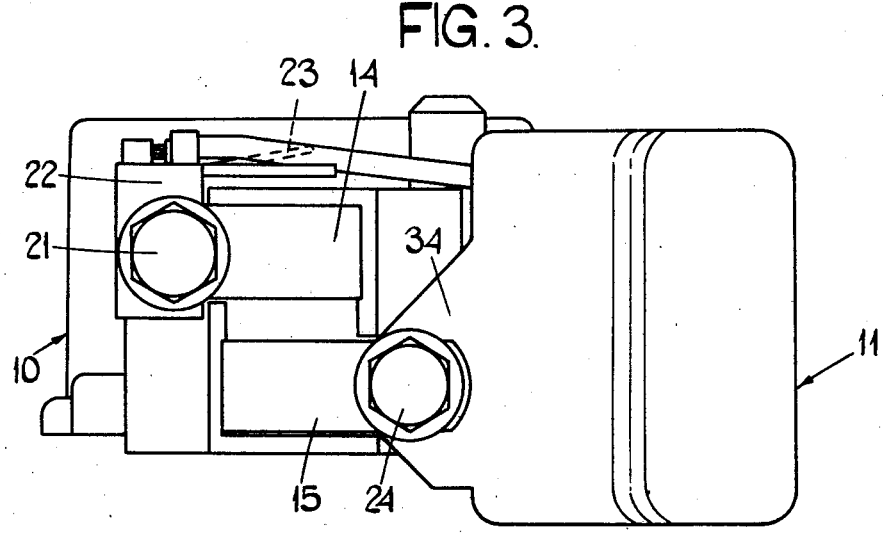
Figure 4:
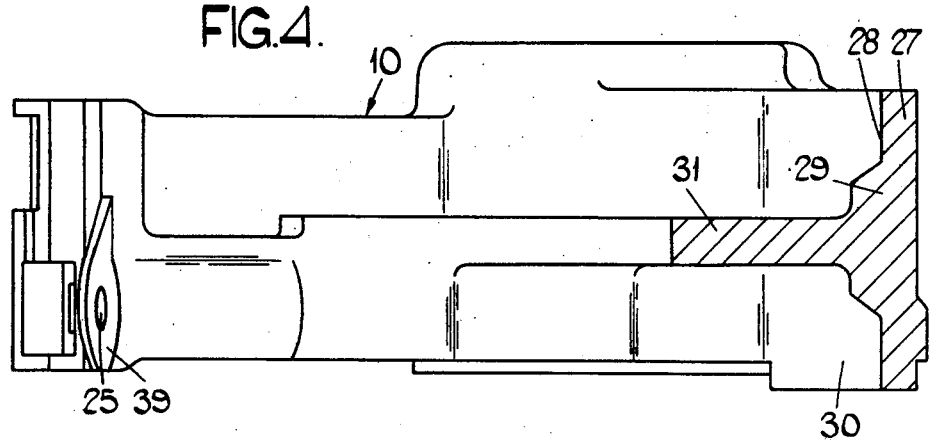
Figure 5:
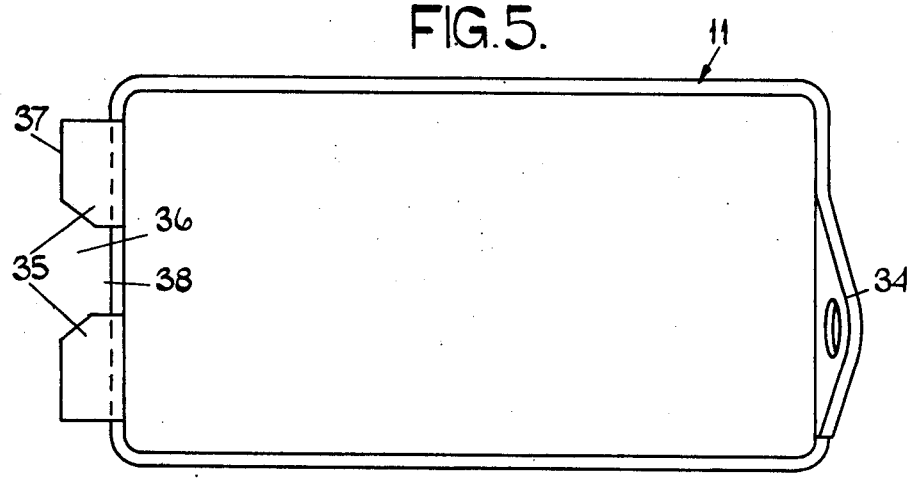

An embodiment of the present invention will now be described, by way of example, with reference to the accompanying drawings, in which:

FIG. 1 is a plan view of one example of a voltage regulator and brush assembly according to the present invention, FIG. 2 is a longitudinal sectional view of a brush housing and brushes of the assembly of FIG. 1, FIG. 3 is an end view of the assembly of FIG. 1, FIG. 4 is a part sectional side view of the brush housing of the assembly, FIG. 5 is an underneath plan view of the body of the voltage regulator, and FIG. 6 is a longitudinal sectional view of an alternator including the voltage regulator and brush assembly of FIGS. 1 to 5.

Referring to the drawings, the assembly comprises a glass filled nylon brush housing 10 upon which is supported a voltage regulator body 11. The brush housing 10 houses a pair of brushes 12 and 13 which are electrically connected with electrically conductive plates 14 and 15, respectively, via respective flexible conductors 16 and 17. As is usual with electrical brushes, the brushes 12 and 13 are biased by respective compression springs 18 and 19. The conductor plates 14 and 15 serve as fixed abutments for the springs 18 and 19 and a seal 20 prevents ingress of dirt and moisture past the plates 14 and 15 and into the housing 10. The conductor plate 14 is secured to the housing 10 by means of a fixing screw 21 and also includes a conductor plate portion 22. The conductor plate portion 22 includes an integral terminal 23. The conductor plate 15 is secured to the housing 10 by means of a self tapping fixing screw 24 which passes through an aperture (not shown) in the conductor plate 15 to engage in a blind hole 25 formed in the housing 10. The housing 10 further includes a cup-shaped portion 26 into which the free ends of the brushes 12 and 13 project. The brush housing 10 further includes an integral hooked portion 27 which is disposed at the opposite end of the housing 10 to the plate 15 and fixing screw 24. The hooked portion 27 defines therein a recess 28 which opens in the direction of the fixing screw 24. The recess 28 is provided with a shoulder 29 therein which increases in width inwardly from an opening 30 of the recess 28 which faces the fixing screw 24. The shoulder 29 is integral with the remainder of the housing 10 and has integrally extending therefrom a strengthening rib 31 which extends generally in the direction of the fixing screw 24.

The cup-shaped portion 26 has a pair of blind holes 32 therein. Lastly, the housing 10 is further provided with a pair of integral apertured flanges 33. The purpose of the blind holes 32 and apertured flanges 33 will be described hereinafter.

The voltage regulator body 11 is basically in the form of an electrically conductive metal cup having an apertured flange 34 extending from one end thereof and a cranked tongue 35 extending from the opposite end thereof. The regulator body 11 houses voltage regulation circuitry which is of a per se known type and which will not be described herein in any detail except to state that a part of the circuitry which is to be connected with brush 13 is electrically connected to the body 11. The cranked tongue 35 has a slot 36 extending from a free end 37 thereof. The slot 36 tapers inwardly from the free end 37 so that the taper of the slot 36 corresponds to the flare of the shoulder 29. The slot 36 is provided with substantially untapered extension 38. The tongue 35 of the regulator body 11 is engaged in the recess 28 so that the tapered edges of the slot 36 engage against the flared edges of the shoulder 29. The apertured flange 34 of the regulator body 11 overlies a recessed surface 39 on the housing 10, the surface 39 surrounding the blind hole 25. The recessed surface 39 corresponds in outline to the free end of the apertured flange 34 and the arrangement is such that when the apertured flange 34 engages against the surface 39, the free end 37 of the tongue 35 lies within the recess 28 but does not abut against the bottom of the recess 28. As will be appreciated from the above description, the apertured flange 34 of the regulator body 11 is disposed between the recessed surface 39 and the conductor plate 15. During assembly, when the fixing screw 24 is tightened down, the apertured flange 34 of the regulator body 11 is urged towards the recessed surface 39 which causes the regulator body 11 to be moved bodily in a direction which causes the tongue 35 to be moved further into the recess 28 so that a wedging action between the flared ends of the shoulder 29 and the tapered end of the slot 36 occurs. This results in an extremely secure connection between the voltage regulator body 11 and the housing 10. As a result of this, there is a minimum of risk of vibration of the voltage regulator in use relative to the housing 10 so that a more reliable assembly is provided.

Referring now to FIG. 6 of the drawings, the alternator illustrated therein comprises generally a stator assembly 40, a rotor assembly 41, a rectifier assembly 42 and the voltage regulator and brush assembly described hereinabove. A rotor shaft 43 of the rotor assembly 41 projects through an end bracket 44 of a housing 45 of the alternator and is rotatably mounted in bearings 46.

A slip ring assembly 47 is mounted on that end of the rotor shaft 43 which projects externally of the housing 45. The brush housing 10 is bolted to the end bracket 34 by means of bolts 48 (only one shown) passing through the aforementioned apertured flanges 33. In this position, the slip ring assembly 47 lies within the cup-shaped portion 26 and the brushes 12 and 13 engage against respective slip rings of the assembly 47. A cap 49 overlies the regulator and brush assembly, and the rectifier assembly and is secured in position by bolts 50 which engage in screw threaded fashion in the blind holes 32 in the cup-shaped portion 26. Leads 51 from the stator assembly 40 are connected with the rectifier 42 which is also connected with brush 12 by way of the conductor plate portion 22. The terminal 23 may be connected with a surge protection diode (not shown). The plate portion 22 is also connected with a lead 52 leading from the voltage regulator. Another lead 53 from the voltage regulator is connected with a terminal 54 for external connection into the wiring circuitry of a motor vehicle fitted with the alternator. Another lead 55 of the voltage regulator is connected with the rectifier 42. The precise construction of the rectifier 42 will not be described in any detail herein since it forms no part of the present invention. Its construction, however, together with its interrelationship with the voltage regulator and brush assembly will be readily apparent to any person skilled in the art.

We claim:

1. A voltage regulator and brush assembly in which a body of the voltage regulator is mounted on a housing of the brush assembly by means of a screw connection and a co-operating wedging formation between a tongue projecting from the body and a recess in the housing, in which recess the tongue engages, the screw connection and co-operating wedging formation being arranged so that tightening of the screw connection serves to increase the wedging action between the tongue and the recess whereby a firm connection between the voltage regulator and the brush housing is obtained.

2. A voltage regulator and brush assembly as claimed in claim 1 wherein the tongue has a slot in a free end thereof, said slot tapering inwardly from the free end, and the recess in the housing has a shoulder therein which increases in width inwardly from an opening of the recess into which the tongue projects.

3. A voltage regulator and brush assembly as claimed in claim 2 wherein the housing has a reinforcing rib which extends from the shoulder under the regulator body towards the screw connection, and an extension of the slot in the tongue of the regulator body accommodates the rib.

4. An alternator including a voltage regulator and a brush assembly as claimed in claim 1.

5. A voltage regulator constructed and adapted to form part of the assembly as claimed in claim 1.

* * * * *